INVENTORS.
LAMBERT HANER
EUGENE F. JAMES

United States Patent Office 3,516,617
Patented June 23, 1970

3,516,617
DIGITAL SYSTEM FOR AUTOMATIC SPLICE CONTROL
Lambert Haner, Rocky River, and Eugene F. James, Brookpark, Ohio, assignors to Avtron Manufacturing, Inc., Cleveland, Ohio, a corporation of Ohio
Filed July 24, 1968, Ser. No. 747,378
Int. Cl. B65h *19/12*
U.S. Cl. 242—58.2     3 Claims

ABSTRACT OF THE DISCLOSURE

An automatic control has at least two pulse train circuits, one responsive to r.p.m. of either of two rolls of paper stock, and the other responsive to f.p.m. line speed as paper is pulled off of the same one of them. Subsequent event control is provided by digital counters for comparing the two pulse trains. The result is used to start additional digital counters, one controlling splice of web (as found on one roll) to web (as drawn from the other roll), and the other counter controlling subsequent shear of web from roll no longer to be processed. The double thickness at the splice is thus minimized and held to a constant length despite variations in roll diameter and/or line speed.

BACKGROUND OF THE INVENTION

This invention relates to a control system having particular significance as an Automatic Splice Control, as for application in process industries where the splicing of a replacement roll of material to an expiring roll is desired to be accomplished automatically in order to maintain a continuous process operation. Heretofore, such a flying splice has been believed difficult or impossible to achieve because idler or pull roller speeds (indicative of web travel in feet per minute) are desirably constant, yet it is instantaneous state (e.g., diameter, hence r.p.m. speed) of the expiring feed roll, and the state (e.g., speed in r.p.m., as well as instantaneous angular position) of a replacement roll which are determinants of just when, how, or whether splicing should take place. Thus the art has put up with old roll diameter measuring (by eye, by hand, or automatically) plus some splicing technique, such as complete stoppage of line, or other manual or automatic operation which is neither reliable nor successful. Further, no previous technique has been developed which would guarantee the length of the double thickness at the splice joining a new web with an expired roll web.

An object of the present invention is to provide simple and inexpensive means for overcoming the above mentioned difficulties.

BRIEF DESCRIPTION OF THE DRAWING

Other objects and various advantages will be understood from consideration of the following description taken in connection with the accompanying drawings, in which.

DESCRIPTION OF PREFERRED EMBODIMENT

Figure 1:
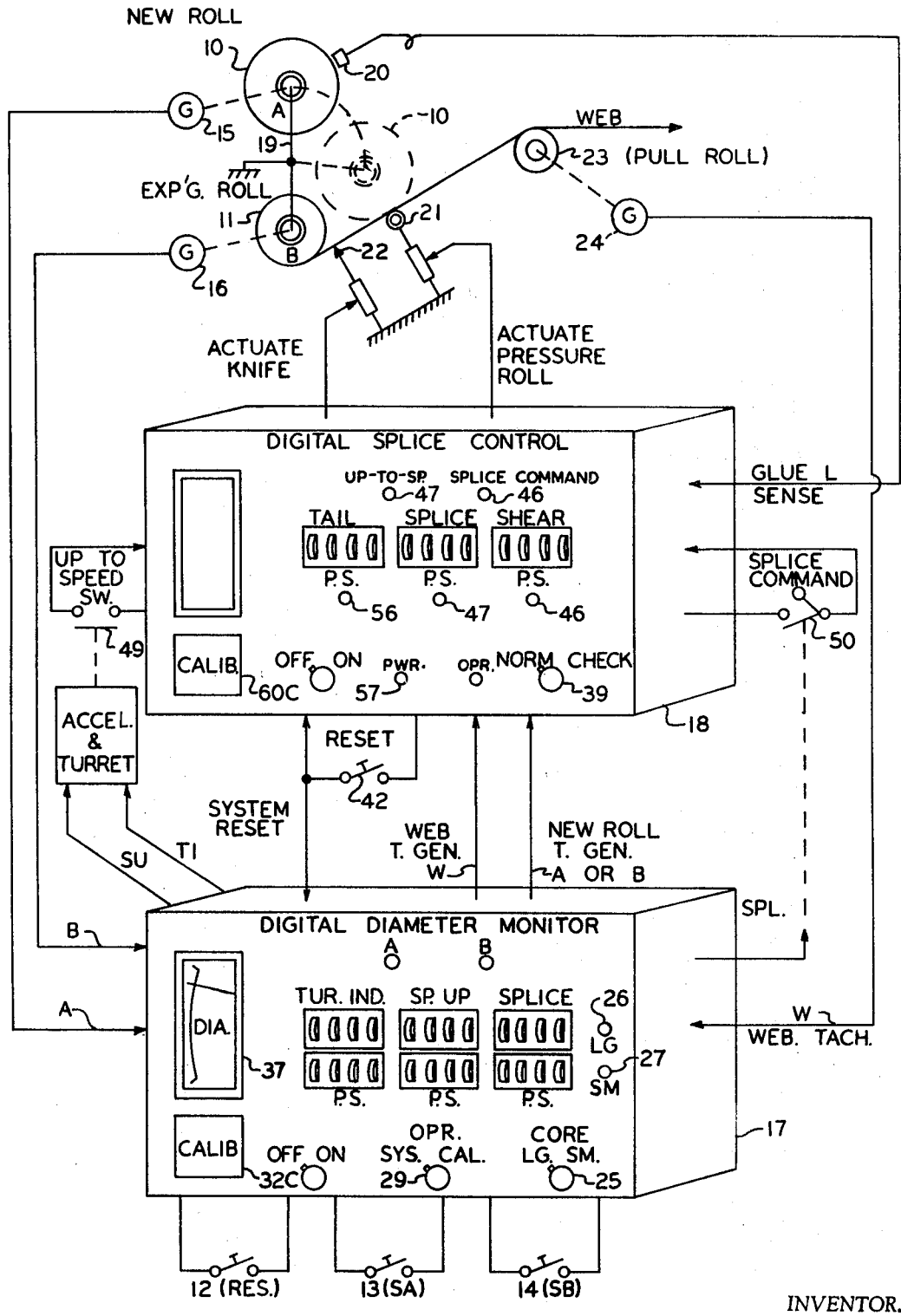
FIG. 1 is a block diagram functionally illustrating interconnection between digital diameter monitoring and splice control equipment and various sources of control signals, according to the invention.

Referring first to FIG. 1 which shows how pulses from a monitored roll are derived. The monitor unit 17 is shown equipped with a reset switch 12. The monitored roll may be selected as either a New Roll 10 or an Expiring Roll 11, as by manipulation of switches 13 (Select A) or 14 (Select B). New roll 10 (e.g., a standby roll of paper stock) has its angular speed transduced by a mechanically connected pulse generator 15. Expiring Roll 1 has its angular speed measured by a pulse generator 16. The electronic control is shown consisting of the two digital equipments, one the Digital Diameter Monitor 17, the other a Digital Splice Control 18. Monitor 17 is assumed intended to first monitor diameter of the expiring roll 11. Digital Splice Control 18 is used in conjunction with an independently operable (by apparatus not shown) turret arm 19 and glue line sensor 20 (which might be a photocell). The Splice Control 18 is used to active splicing mechanism comprising a pressure roll 21 (activated, e.g., electromechanically, to cause splicing when the web material from the expiring roll is brought in contact with the glue line on the oncoming new roll), and a shear knife mechanism 22 (for cutting free from old roll, a predetermined time after splice is made).

A web (process line) pull roll 23 has an associate tachometer pulse generator 24 which provides a reference (derivation being from a constant, and known, diameter roll) to the electronic equipment, of which the Digital Diameter Monitor 17 will be first described.

Monitor 17 acts as a precision instrument for monitoring, according to operator and electronic selection, the diameter of either of rolls 10 or 11, a front panel illumination of lamp A or lamp B being of convenience to indicate which roll is being monitored. Because both of rolls 10 and 11 move with rotation of turret arm 19, as time goes by the new roll 11 becomes an old roll (at A), and the prior nearly expired roll is replaced by a new roll (at B), but at any event pulse generator information from one roll, which is New Roll 10 for the moments shown by the drawing, and so involves tachometer generator 15, is fed through the Monitor 17, and then (as illustrated) by line marked "A or B" to the Splice Control Unit 18 (of FIG. 3) for using during the splice operation.

Different rolls of paper may have variant diameter cores and so the Monitor 17 is desirably provided with a core size selector 25 allowing two diameter level settings available for selected (A or B) roll with lamps 26, 27 showing which set of presets are selected for the particular core size, thus allowing the user to interchange rolls with different core diameters without the necessity of changing other (later described) diameter preset requirements.

Figure 2:
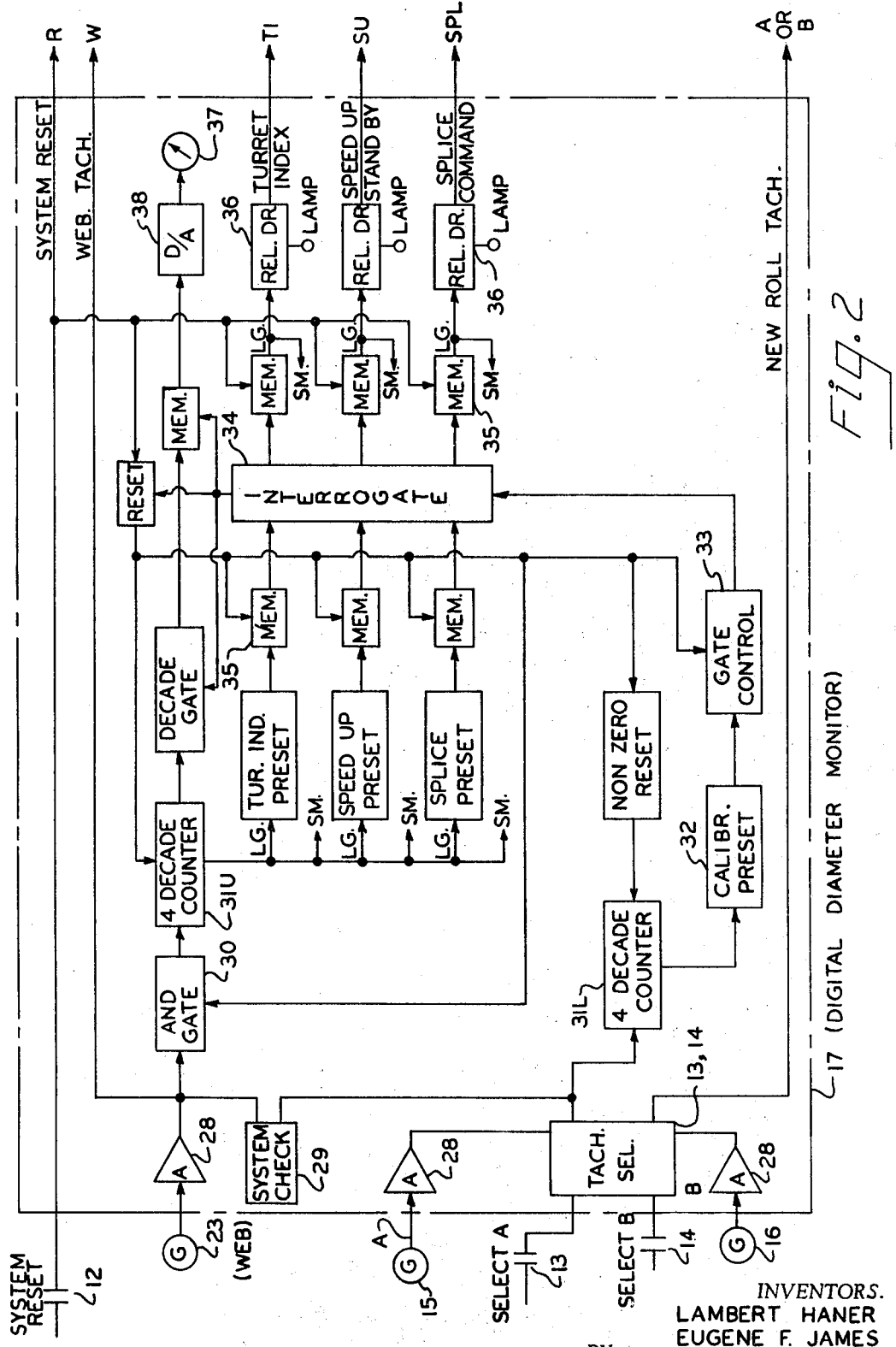
FIG. 2 is a functional block diagram of a Digital Diameter Monitoring Unit (17 in FIG. 1) according to a preferred embodiment.
Figure 3:
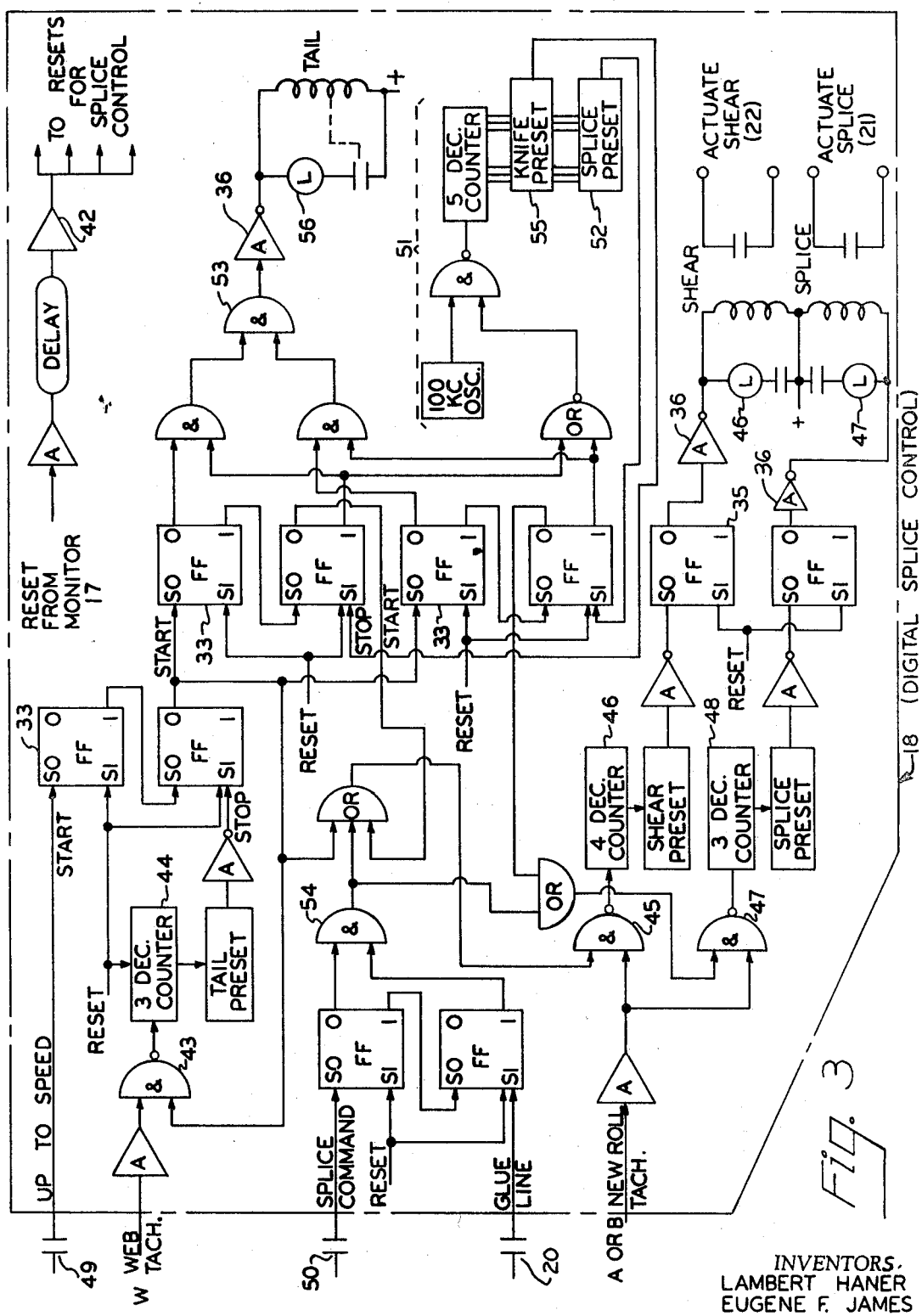
FIG. 3 is a functional block diagram of a Digital Splice Control Unit (18 in FIG. 1) according to a preferred embodiment.

Perhaps the rest of the equipments 17 and 18 in FIG. 1 can best be understood by next considering FIGS. 2 and 3. In FIG. 2 the Digital Diameter Monitor is shown provided with amplifiers 28 for the pulse generators and a system check (i.e., standard logic and selector switch permitting "System," "Operate" or "Calibrate") as indicated at 29 in FIGS. 1 and 2. Standard AND (or other) gating is used as at 30 to feed a counter 31U, having four decades each of which may sequentially run up past 9 and then provide a signal to the next equipment in line with, in well known fashion, rotary calibrator adjustment preset switches and logic circuitry providing output. For the illustrated Monitor 17, three presets labeled TUR. IND. PRESET, SP. UP PRESET, and SPLICE PRESET are associated with the counter 31U to provide subsequent event control by permitting Preset (according to expiring roll diameter) for (1) Turret Indexing (to bring new roll in position for a splice), (2) Speed Up (to actuate new roll drive mechanism, assumed though not shown, in order to accelerate that roll to match the web, line, speed), and (3) Splice (an event desirably occurring at minimum allowable diameter of the expiring roll and enabling the splice sequence to be activated). Upon reaching any of the preset diameters, a signal lamp illumination could occur even though this not be shown in each of the drawings.

Monitor 17 monitors either one of two rolls by computing the diameter of the monitored roll by comparing the ratio of pulse repetition rates from one tachometer generator (attached to the monitored roll, A or B) and another (24) attached to a reference roll monitoring web speed. To bring pulse ratio into correspondence with actual diameter ratio, one of the pulse trains is multiplied by a calibration factor. In the embodiment illustrated in FIG. 2 this is done by taking monitored roll pulses, e.g. as amplified by respective amplifier 28 and selected by 13 or 14, through a four decade (as shown, lower) counter 31L associated with a (e.g., thumb wheel) calibrate preset 32 which, because the parameters won't usually change for a particular installation, is enclosed behind a blank (removable) cover 32C as indicated in FIG. 1. Next the tachometer information from monitored roll, as amplified and calibrated is differenced, e.g. by being supplied through a gate 33 to an Interrogate circuit 34 so that when the lower counter 31L reaches a number (predetermined in 32) the upper counter 31U is gated off, with the number of pulses accumulated in the upper counter during the count time being in correspondence with the diameter of the monitored roll. Various memories 35 may each be simply a flip-flop, and well known circuitry can also be used for relay drivers 36. A meter 37 (in FIG. 1) can be energized from a digital to analog converter 38 to indicate a previous diameter reading until interrogation of the upper counter readjusts it. Switches 13 and 14, which might be manual or automatic, are preferably interlocked (or combined in one switch, so if one is "On" the other is "Off"), and even so it is preferred to require system reset signal (as by closure of 12) to deactivate relay contact closures before any new count begins, as when a new roll has been placed in position to be monitored.

For maximal clarity with minimal restriction, the disclosures in the various drawing figures are not in exact correspondence. Thus, the core size selector switch 25 is shown in FIG. 1 while not in FIG. 2, but those in the art will understand that three presets and six memories can be switched into the relay driver output circuits for "LARGE" (and a lamp lit) and three more presets and six more memories alternatively switched in for "SMALL" (and another lamp lit).

The Digital Splice Control 18 of FIG. 3 activates the pressure roll 21 and shear knife 22 in the splice sequence. The system reset signal resets counters, hereinafter described, as well as memories 35 (of FIG. 3) to their initial states.

In order to maintain confidence that the entire system is functioning properly, both the Monitor 17 and the Splice Control 18 have provisions for self-checking, such as selector 29 in FIGS. 1 and 2, and a "Normal-Check" selector 39 in FIGI. 1 (not shown in FIG. 3), while System Reset may be provided for both (switch 12 in FIGS. 1 and 2), as well as individual reset for the Splice Control alone, as by a switch 42 (FIG. 1).

Various gate controls (flip flops) 33 control various gates such as gate 43 for gating web tachometer pulses for supplying them to a 3-decade counter 44, gate 45 for gating new roll tachometer pulses for supplying them to a 4-decade counter 46, gate 47 for gating new roll tachometer pulses for supplying them to a 3-decade counter 48. The counters have respective presets, a Tail Advance Preset (hereafter explained), a Shear Preset, and a Splice Preset. Finally various memories 35 (also shown as flip flops) and relay drivers 36 (shown as amplifiers) or somewhat equivalent equipment perform the various output functions.

When the turret 19 (FIG. 1) indexes the new roll 10 into position and when the new roll has also been accelerated to match the web speed, an Up-To-Speed signal is assumed to be provided by a switch 49, e.g., in the accelerations equipment not described in detail since it may be conventional. This Up-To-Speed signal initiates operation to bias all of the FIG. 3 counters for tail-length and reaction time. First, the Tail Advance Counter 44 and the Shear Counter 46 are enabled to compensate for that portion of the static (hereinafter defined) web tail to eliminate that not wanted. When the Tail Advance Counter 44 (monitoring web tach) reaches the preset count equivalent to the web length that is necessary to reduce the static tail to the desired tail, the Shear Counter 46 (monitoring New Roll tach) is temporarily disabled.

Since the angular position between the detector 20 axis and the impact point of the pressure roll 21 upon the new roll 10 is known, this displacement is expressed in terms of the number of pulses emanating from the tachometer monitoring the new roll 10. With the transmission of a signal indicating that the glue line is in coincidence, e.g. from 20 (FIG. 1), the counter 48 (FIG. 3) keeps track of the number of tachometer pulses, hence the angular position of the glue line.

For a known and consistent reaction time, and of course that of the electromechanical pressure roll actuation mechanism is greater than that of the electronic circuitry, the displacement of the glue-line from a desired impact point becomes a function of the angular velocity of the roll. By determination of total angular displacement of the glue-line during such reaction time, activation of the pressure roll mechanism (hence splice) can appropriately occur. To this end, counter 48 is conveniently programed to provide the pressure roll actuation signal when the glue-line has traversed a number of revolutions (such that new roll is at maximum speed and old roll is at minimal diameter) plus some additional displacement to ensure that the glue-line is forward of the impact point when the pressure roll makes contact between old web and new roll.

When the Up-To-Speed signal is given by 49, indicating that new roll speed has been matched to web speed, a time base generator counter combination, 51 in FIG. 3, is enabled, allowing the counter 48 to store required pulses equivalent to reaction time. This biases counter 48 to compensate for the reaction time that will ensue, so that for the total displacement (or count) required, a displacement equivalent to the reaction time is subtracted to give the displacement the glue-line must undergo to assure its proper position when the pressure roll impacts.

A Splice Command signal initiates the actual splice operation when the expiring roll approaches a minimal diameter. When the Splice Command signal is provided (by SPL lead of FIGS. 1 and 2, or switch 50 of FIGS. 1 and 3), the counter 48 (FIG. 3) will resume counting the moment the glue-line passes the photo-detector 20. When the counter reaches the preset count, the pressure roll 21 mechanism is actuated and splice occurs as the pressure roll 21 (FIG. 1) brings the line material in contact with the glue-line on the oncoming (new) roll 10. The control system is preferably designed to allow the new roll to rotate about one revolution in contact with the pressure roll before splice occurs.

Actuation for Shear (knife) operation is analagous. The angular displacement of a roll (which might be another roll, but in the illustrated embodiment is roll 10) during the knife 22 reaction time interval is "computed" (through time base generator and counter 51 feed of preset), and the shear counter 46 is thereby biased. If the shear counter preset reflects the angular displacement required for the glue-line to be in coincidence with the web at the pressure roll impact point, the web tail length would be equal to the static distance between the pressure roll impact point and the knife impact point. The tail would then be of a constant length independent of web speed or roll diameter. Desirably (e.g., splice double thickness considerations) the tail length may be less than the static distance from pressure roll impact point to knife impact point. This involves a non-linear relationship with respect to web speed and any roll diameter, but can be accomplished by determining angular displacement of new roll as a function of linear displacement of web. This is accomplished in the illustrated embodiment by the inclusion of the Tail Advance circuit comprising tail preset counter 44, etc. in FIG. 3, and which, through 33 and 45, provides an additional bias to the shear counter 46, so that the knife 22 will actuate earlier by an interval equal to the time required for the tail to be reduced from the static distance to the desired tail length. When the tail advance counter 44 (monitoring web tach) reaches the preset count equivalent to the web length that is necessary to reduce the static tail to the desired tail, the shear counter 46 is temporarily disabled.

Upon completion of the tail advance computation, the time base generator counter 51 is activated and thus the knife reaction time at 55 as well as the pressure roll reaction time preset 52 previously described are taken into account. Thereafter, the shear counter 46 is again enabled, the splice counter 48 is enabled and the angular displacements of the new roll during the respective reaction times are stored. The shear and splice counters (46, 48, respectively) are thus biased to reflect the angular displacement compensation required of the new roll prior to activating the pressure roll and knife mechanisms, and a tail preset lamp 56 may be illumined to signal that all pre-splice computations have been accomplished. Other lamps may indicate other things, such as Power On (57 in FIG. 1), Up To Speed (47), Splice Command (46), or whatever be desired.

Presets 52 and 55 for the counter associated with the time base generator (of FIG. 3) can either be exposed, as on a panel, or hidden (as behind the cover 60C in FIG. 1).

There is thus provided apparatus of the class described capable of meeting the object above set forth. In operation the splice counter preset permits actuation of the pressure roll mechanism when the total number of new roll tach pulses accepted is equivalent to the angular displacement required such as that the glue-line has just passed the pressure roll. The shear counter preset is desirably adjusted to allow an additional revolution before the knife mechanism is actuated.

Paper wastage is minimized (by retaining only minimal amounts of material on expiring rolls, and by maintaining constant tail lengths). The system functions automatically despite any change of web (line) speed and may be adjusted to be independent of new roll I.D. or O.D. Diameter of most critical roll is always known, and location of glue-line is always known, initially, during its displacement, and where it has to be when the pressure roll impacts. The use of integrated circuitry, hence solid state components, insures reliable operation and the advantages of modular construction while assuring that each of the Monitor 17 and the Splice Control 18 may be mounted in a standard (e.g., 19") instrument console.

While we have illustrated and described particular embodiments, various modifications may obviously be made without departing from the true spirit and scope of the invention which we intend to have defined only by the accompanying claims taken with all reasonable equivalents.

We claim:

1. An automatic control system comprising a digital diameter monitor and having
    a first tachometer generator source of pulses indicative of r.p.m. speed of a first roll of sample material,
    a second tachometer generator source of pulses which is indicative of linear speed of travel of sample material as drawn from said first roll,
    a third tachometer generator source of pulses indicative of r.p.m. speed of a second roll of sample material,
    a switch and interconnected first counter means for selectively counting pulses from either one of said first and third tachometer sources of pulses by connection with one or the other of said sources,
    second counter means energized from the second tachometer source of pulses and for establishing a reference,
    reset means connected to reset and gate both counters on,
    logic means connected to gate one counter off according to a predetermined count accumulated in the other,
    and plural presets connected to be responsive each to a different accumulated count in one of said first and second counter means and for providing plural useful outputs from said digital diameter monitor.

2. An automatic control system as in claim 1 further characterized by
    the control system also having a digital splice control
    the digital diameter monitor and the digital splice control having plural interconnection means for carrying from one to the other signals representative of:
        system reset,
        second tachometer generator source of pulses output,
        the one of first and third tachometer generator sources not selected by the digital diameter monitor switch associated with the interconnected first counter means,
        speed up new roll,
        turret index,
        splice command,
        and the digital splice control being operatively associated with
            a glue line sensor means,
            a pressure rolls, and
            a shear knife,
        said digital splice control having a third counter means connected for counting said second tachometer generator pulses, a fourth counter means connected for counting pulses from the one of the first and third tachometer generator sources not selected by the digital diameter monitor switch for association with the first counter, plural presets, one connected to the output of said third counter, and another connected to the output of said fourth counter,
        gate means for starting the counters responsive to reset and responsive to glue line sensing, splice command, speed up new roll and up to speed thereof signals,
        and plural means for respectively activating said pressure roll and actuating said shear knife according to accumulated count and preset of said third and fourth counters.

3. An automatic control system as in claim 2 further characterized by the gate means including a time base generator, a fifth counter means energized from said time base generator and for knife preset counting and for pressure roll preset counting, whereby to provide reaction time compensation for maintaining constant tail length irrespective of web speed or old roll diameter.

References Cited

UNITED STATES PATENTS

| 3,317,153 | 5/1967 | Raymond | 242—58.3 |
| 3,391,877 | 7/1968 | Angell et al. | 242—58.3 |

LEONARD D. CHRISTIAN, Primary Examiner

U.S. Cl. X.R.

156—361, 504